March 29, 1932.    O. M. WERMICH    1,851,027
HEAT EXCHANGE DEVICE
Filed Oct. 23, 1929

Witness:
William P. Kilroy

Inventor.
Otto M. Wermich
by Hill & Hill
attys

Patented Mar. 29, 1932

1,851,027

UNITED STATES PATENT OFFICE

OTTO M. WERMICH, OF CHICAGO, ILLINOIS, ASSIGNOR TO MODINE MANUFACTURING COMPANY, OF RACINE, WISCONSIN, A CORPORATION OF WISCONSIN

HEAT EXCHANGE DEVICE

Application filed October 23, 1929. Serial No. 401,666.

The invention relates to heat exchange devices and has among its principal objects to provide a device of this character with means for humidifying the heated air, the humidifier providing an element of means for regulating the amount of heated air passing from the device and being capable of providing means to prevent the discharge of heated air from the device.

A further object of the invention is to construct the humidifier to provide a deflector for deflecting the heated air from the device into a room to be heated, the combined humidifier and deflector being capable of accomplishing regulation of the passage of heated air and also preventing the discharge thereof from the device.

Another object of the invention is to arrange said humidifier relatively to the casing in which the device is located so that a certain quantity of the heated air is directed over the humidifier prior to its discharge from the device and to combine a structure such as this with means whereby the circulation of air in the manner just referred to is prevented when said humidifier is arranged to prevent the escape of heated air from the device.

An additional object of the invention is to provide means for actuating the structure and to locate a certain element of said means outside of the casing for the device so that said structure may be operated from the outside of the casing to accomplish the various above mentioned advantages.

The invention has these and other objects, all of which will be more readily understood when read in conjunction with the accompanying drawings in which one embodiment of which the invention is susceptible is disclosed, it being obvious that changes and modifications may be resorted to without departing from the spirit of the appended claims forming a part hereof.

In the drawings, Fig. 1 is a front elevation of a heat exchange device having a portion thereof broken away for the purpose of illustration;

Figure 1:
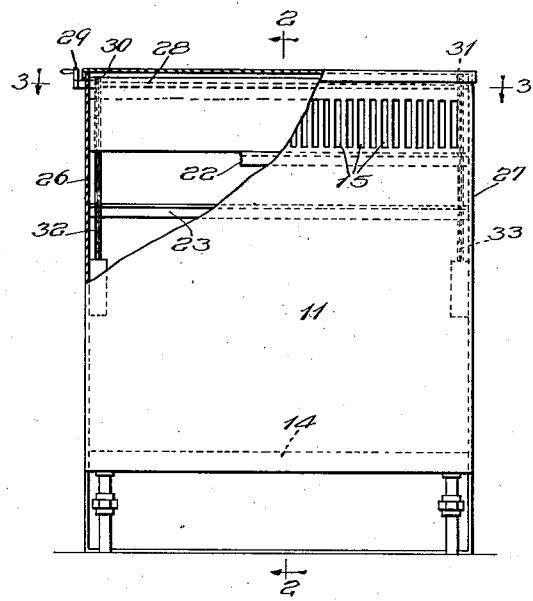

The structure disclosed in the drawings contemplates the use of a casing generally designated 10. The front wall 11 of the casing is of a length substantially less than the rear wall 12 thereof to provide an opening 13, the opening being provided to allow air to be introduced to the interior of the casing and be heated by the heat exchange device 14 located within the casing and adjacent the opening 13. The front wall 11 is provided with a plurality of openings 15 which are provided to allow the heated air contained within the casing to escape therefrom into the room to be heated. The casing generally designated 10 may have its upper end closed by a removable cap or cover plate 16 and this end of the casing directly below the cover plate may be provided with a plurality of openings 17. The purpose of these last mentioned openings 17 will be explained in the following:

A water tank or humidifier 18 is arranged in the upper portion of the casing and is preferably located in spaced relation to the wall 10 of the casing to provide a passage 19 through which a portion of the heated air may pass and be discharged from the casing through the opening 17. It is manifest that this arrangement compels this last mentioned heated air to pass over the open end of the tank 18 and be humidified prior to its discharge through the opening 17 provided in the front wall of the casing. A wall such as 20 of the tank 18 is curved from adjacent the wall 10 to the front wall 11 and terminates near the upper end of the openings 15 provided in the wall 11. From this it can be seen that another portion of the heated air contained in the casing 10 is deflected from the casing and discharged out through the openings 15 provided in the casing. It is manifest that by virtue of the fact that this wall is in direct contact with the heated air, the water in the tank 18 will become heated and thus cause evaporation of the water contained in the tank which will humidify the air passing over the tank prior to discharge of the air from the casing.

As before stated, it is one of the prime objects of the invention to utilize this tank 18 as a damper to regulate the amount of heated air passing from the casing and to also provide means for completely preventing the escape of heated air from the casing. To this end, the tank 18 is mounted for movement relatively to the casing and with respect to the openings 15 provided in the casing.

Figure 2:
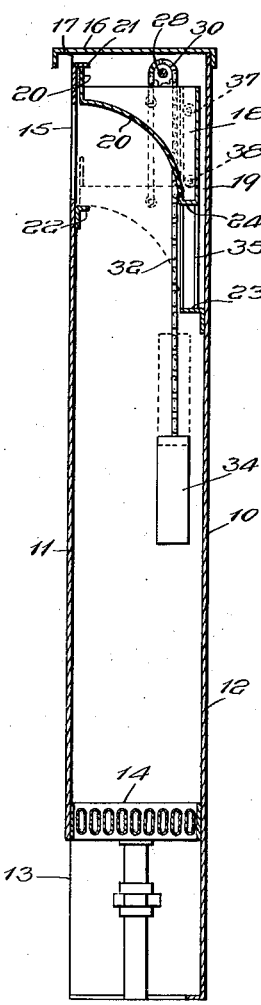
Fig. 2 is a section taken on the line 2—2 of Fig. 1 on a slightly enlarged scale.

It will be noted that the wall 20 of the tank extends a suitable distance beyond the rim or upper edge of the tank, and therefore, when said tank is in its fully elevated position, this extension 20 engages a stop 21 which stop extends from the wall 11 of the casing and will thus limit the upward movement of the tank and arrange the deflecting wall 20 in proper relation to the openings 15. It is evident that when the tank 18 is moved downwardly, a portion of its full extent of movement, that the wall 20 thereof is arranged with respect to the openings 15 so that these openings 15 are only partially closed which will control the amount of heated air passing these openings. The casing generally designated 10 is further provided with the inwardly projecting ledges respectively designated 22 and 23, which are provided to engage the tank 18 and to cooperate therewith to completely stop the flow of heated air from the casing. It is evident that when the tank 18 is arranged in the dotted line position thereof shown in Fig. 2 that the upper termination of the curved wall 20 of the tank and the lower termination 24 thereof respectively engage the ledges 22 and 23 and thus will prevent the passage of air from the casing.

Figure 4:
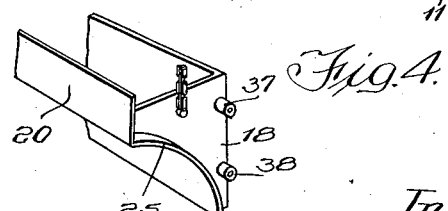
Fig. 4 is a perspective view of one end of a tank providing the humidifier shown in Figs. 1, 2 and 3.

It will be noted by reference to Fig. 4 that the tank 18 has its opposite ends provided with an endwise projecting arcuate flange 25 which respectively cooperates with the end walls 26 and 27 of the casing to prevent heated air passing at this point, it being understood that when the tank or receptacle 18 is arranged in its fully lowered position, said flanges cooperate with the ledges 22 and 23 and thus with the tank completely close the duct provided within the casing.

Means is provided for controlling the movement of the receptacle or tank 18 and also guiding said tank during said movement. Any desirable structure may be employed for this purpose, the particular means herein shown and described for accomplishing this last mentioned end includes a shaft 28 which extends from one end wall 26 to the other such as 27 of the casing and is journalled therein. This shaft is provided with a combined crank and handle 29 and is further provided with the sprockets 30 and 31 over which are respectively trained the chains or cables 32 and 33. Each of the cables is connected to one end of the tank, the opposite ends thereof are provided with a weight such as 34 which will act to counter-balance the weight of the tank or receptacle 18.

The means for guiding the tank during its movement within the casing and relatively to the openings 15, in the present instance, includes tracks or guideways 35 and 36 which are respectively secured to the end walls 26 and 27. These tracks are preferably channel-shaped to receive the anti-friction rollers such as 37 and 38 which are secured to the opposite ends of the tank and ride in the tracks and guide the tank during its movement within the casing 10.

Figure 3:
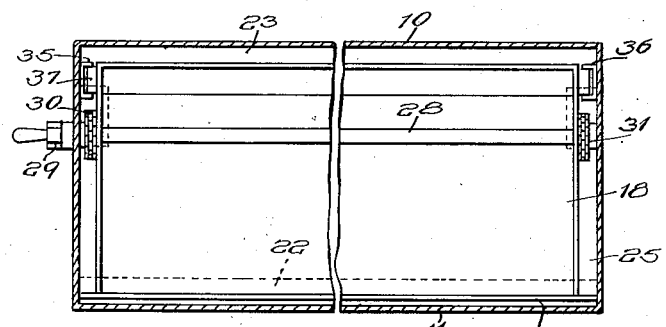
Fig. 3 is a section taken on the line 3—3 of Fig. 1, the structure herein shown being also slightly enlarged over that shown in Fig. 1.

It will be noted by reference to Fig. 3 that the curved flanges 25 provided upon the tank 18 as before stated, cooperate with the flanges 22—23 and thereby prevent the passage of heated air between the end walls of the tank and the end walls 26 and 27 of the casing, it being understood that these flanges 25 are apertured to allow the chains or cables 32 and 33 to be moved with relation to the tanks.

From the foregoing description of the structure, it is manifest that the tank or receptacle 18 with its curved wall 20 provides a combined deflector and humidifier for deflecting heated air from the casing and humidifying a portion of the air escaping from the casing, and that this structure is movable relatively to the openings in the casing to control or completely stop the passage of air from the casing.

Having thus described the invention, what I claim and desire to secure by Letters Patent is:

1. In a heat exchange device, the combination of a casing having an opening through which heated air is discharged from the casing, an element providing a humidifier, a wall thereof providing a deflector, said element being supported for movement relatively to the casing across the opening, and providing means controlling the passage of air through said opening.

2. In a heat exchange device, the combination of a casing having an opening through which heated air is discharged from the casing, an open tank providing a humidifier located in the casing, said tank being arranged in spaced relation to the walls of the casing to permit heated air to pass between said casing, tank and across said tank and out through said opening, said tank being mounted for movement across the opening and providing an element of means preventing the escape of heated air through said opening.

3. In a heat exchange device, the combination of a casing having an opening through which heated air is discharged from the casing, a tank located in the casing having a wall providing means for deflecting heated air through said opening, said tank being movable relatively to the casing and opening, said casing having a flange at one side of said opening with which the tank engages to prevent passage of heated air through said opening.

4. In a heat exchange device, the combination of a casing having an opening through which heated air is discharged from said casing, an element providing a humidifier, a deflector and a damper, said element being movable transverse of the opening within the casing.

5. In a heat exchange device, the combination of a casing having an opening through which heated air is discharged from said casing, an element providing a humidifier, said element being movable within the casing across the opening and having a wall adapted to be arranged relatively to said opening to vary the amount of air passing through said opening, and means with which said element is engageable to prevent the passage of air through said opening.

In witness whereof, I hereunto subscribe my name this 21st day of October, A. D. 1929.

OTTO M. WERMICH.